2 Sheets—Sheet 1.
G. H. CORLISS.
CUT-OFF AND WORKING VALVE FOR STEAM ENGINES.
No. 758. Reissued July 12, 1859.
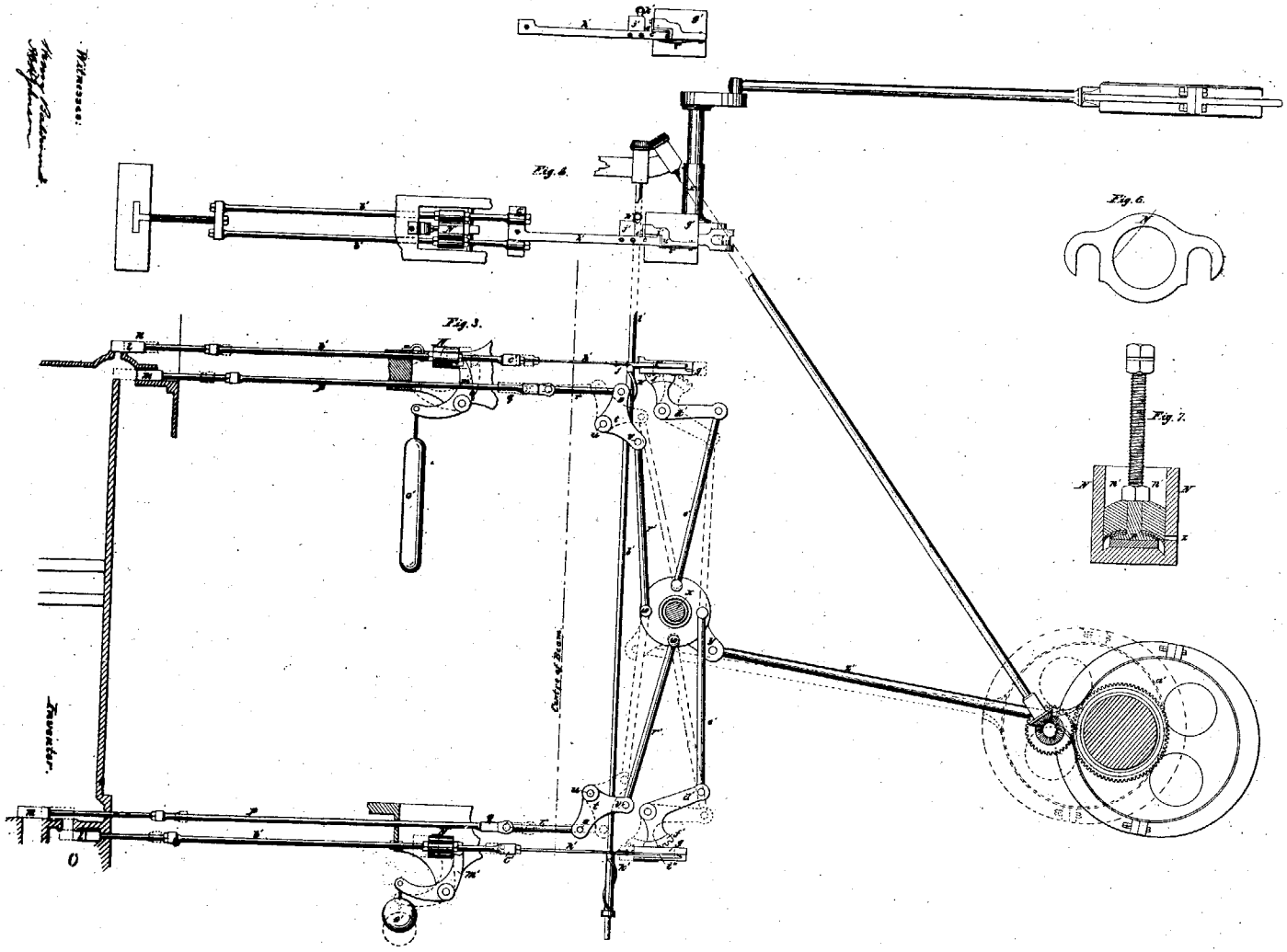
THE NORRIS PETERS CO., PHOTO-LITHO., WASHINGTON, D. C.

2 Sheets—Sheet 2.
G. H. CORLISS.
CUT-OFF AND WORKING VALVE FOR STEAM ENGINES.
No. 758. Reissued July 12, 1859.
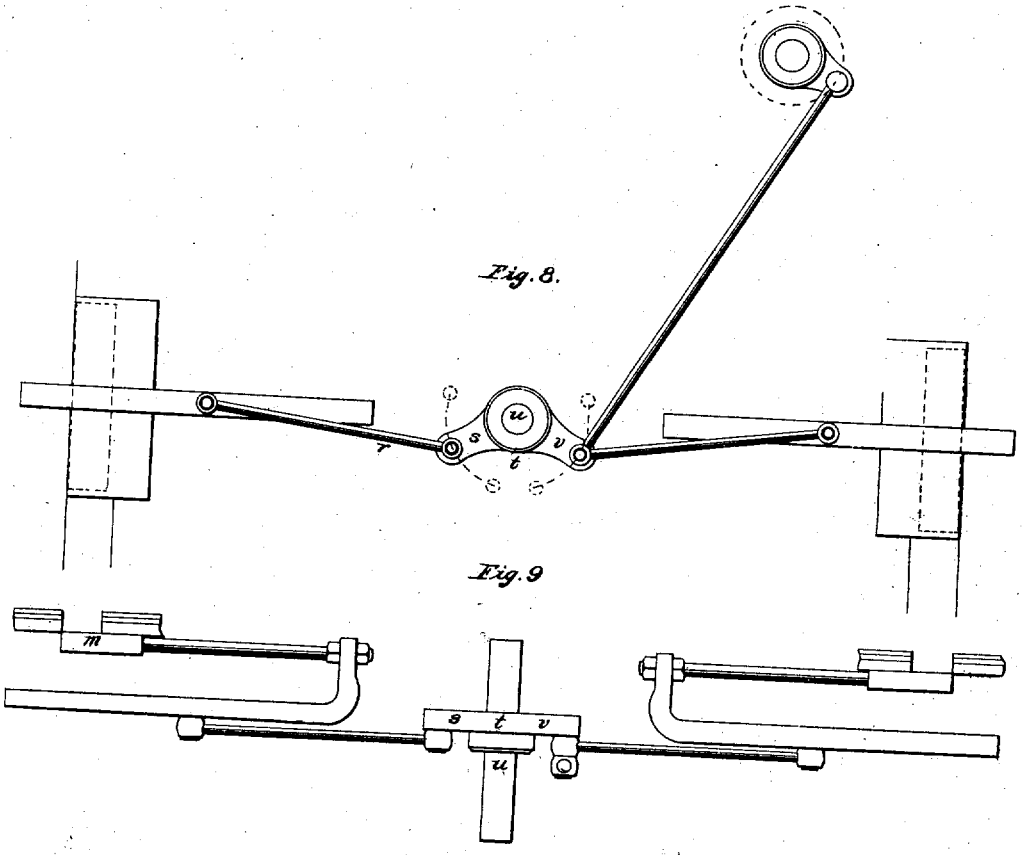
THE NORRIS PETERS CO., PHOTO-LITHO., WASHINGTON, D. C.

UNITED STATES PATENT OFFICE.

GEORGE H. CORLISS, OF PROVIDENCE, RHODE ISLAND.

IMPROVEMENT IN CUT-OFF AND WORKING VALVES OF STEAM-ENGINES.

Specification forming part of Letters Patent No. 6,162, dated March 10, 1849; Reissue No. 200, dated May 13, 1851; Reissue No. 758, dated July 12, 1859.

DIVISION A.

*To all whom it may concern:*

Be it known that I, GEORGE H. CORLISS, of the city and county of Providence, in the State of Rhode Island, have invented a new and useful Improvement in Steam-Engines; and I do hereby declare that the following is a full, clear, and exact description of the principle or character which distinguishes it from all other things before known, and of the manner of making, constructing, and using the same, reference being had to the accompanying drawings, making part of this specification, in which—

Figure 3 represents an elevation of the valves and of the valve-gear of an engine to which my improvements have been applied; Fig. 4, a plan thereof; Fig. 5, a separate section representing a link used in the valve-gear; Figs. 6 and 7, a plan and a section of an air-cylinder and piston for checking the motion of the valve apparatus. Figs. 8 and 9 represent a modified arrangement of the valve-gear embracing my improvement.

The same letters indicate like parts in all the figures.

In that class of steam-engines in which the steam and exhaust ports are opened and closed by separate valves, which slide upon their ports in operating, the practice has hitherto been to effect the alternate opening and closing of the ports at opposite ends of the cylinder by connecting the valves rigidly in pairs, so that when one is moved to open its port the other is forced to move with it to the same extent. Thus each valve is made to traverse the same distance after it is closed and before beginning to open again that it does in opening and closing. Now, as all the movement imparted to the valves after they are closed subserves no useful purpose except to accommodate the exigencies of the operating mechanism, and as the valves labor under the pressure of the steam and require considerable power to work them during the movement which occurs after their ports are closed, an obvious advantage is gained by the introduction of mechanism which, while it retains all the desirable features of former arrangements, reduces the range of movement imparted to the valves after they have closed their ports as compared with their movement in opening and closing their ports.

To accomplish this end is the object of my invention, which consists in operating each valve by means of what may be called a "crank-wrist," placed in such position with respect to the rod and lever or other device by which it is connected with the valve that it may vibrate near its dead-point, or point of least throw, and thus impart a limited motion when the valve is closed, while it vibrates near its greatest throw and therefore imparts a more extended movement when the valve is open.

In the steam-engine represented in the accompanying drawings my invention is embodied in valve-gear, which also embodies, among other things, my improved method of regulating the motion of steam-engines, and is applied both to the steam-valves and to the exhaust-valves. The steam and exhaust valves *l l* and *m m* are situated in steam-chests *n o* at each extremity of the steam-cylinder. The chest *n* at the top is formed in the cylinder-head, while the other, *o*, is let into a recess in the bed-plate. Each exhaust-valve *m* is attached to one extremity of the valve-rod *p*, which is fitted at its opposite extremity with a sliding head, *q*, that is linked by a connecting-rod, *r*, to one arm, *s*, of a bell-crank, *t*. The other arm, *v*, of the bell-crank is connected by a rod with a wrist-pin, *w*, on the wrist-plate *x*. The latter is secured to a rock-shaft, to which the requisite vibratory motion is imparted by an eccentric, *a'*, through the intervention of an eccentric-rod and an arm, *y*, secured to the rock-shaft.

The crank-wrists *w*, for operating the two exhaust-valves *m m*, are in this example a quarter of a circle distant from each other on the vibrating wrist-plate, and so placed thereon that when one wrist is at its point of greatest throw the other is at its dead-point, and when one is imparting to its rod and to the valve connected therewith the greatest movement the other is imparting to its rod and valve the least. Each valve is thus moved alternately fast and slow, and the fast movement of one is effected during the slow movement of the other, nearly the whole movement of the throw of each valve being effected while the port is either partially or wholly open, at which time the least power is required to move it, while as the small remnant of the throw, when the port is closed, is effected during the slow movement, but little power is then required, as the distance to which the valve is moved is now very short. The steam-valves *l l* are worked in a manner similar to that of the exhaust-valves, and in this engine are connected with wrists secured to the same wrist-plate *x*, so that the same eccentric is employed to move both sets of valves.

My mode of regulating the movement of steam-engines is applied to the engine which I am now describing; but as this invention is the subject of a separate patent bearing even date with this, and is therein fully described, I deem a description thereof here unnecessary.

The engine represented in the drawings is constructed with but one eccentric or means of imparting motion to the wrist plate by the revolution of the crank-shaft. The valves are also represented as moved in directions at right angles with the axis of the steam-cylinder, and the valve-gear is adapted to these circumstances. When, however, the valves are so arranged that they move parallel to the axis of the cylinder, as is the customary arrangement in slide-valve engines, the rock-shaft by which they are operated may with advantage be located in a position different from that described above, and the valve-connections must be adapted to this change. A convenient mode of arranging the several parts when the valves move parallel to the axis of the cylinder is represented at Figs. 8 and 9, in which the letters indicate the parts corresponding with those indicated by them in the arrangement before described. In this example only one pair of valves is represented as operated by a wrist-plate appertaining specially to them and vibrated by a revolving crank. In such case the other pair of valves, if operated by a wrist motion, should also be operated by a separate mechanism, which may be similar to this, and being thus separated, each pair may be adjusted to open and close at any period required.

What I claim, and desire to secure by Letters Patent, is—

The method, substantially as described, of operating the slide-valves of steam-engines by connecting the valves that open and close the ports at opposite ends of the cylinder with separate crank-wrists, or their mechanical equivalents, so that from the motion thereof each valve while its port is closed shall move a less distance than it moves in opening and closing its port, while at the same time the two wrists by which the two valves are operated have the same range of motion as described, whereby I am enabled to save much of the power heretofore expended in working the slide-valves of steam-engines, and by which also I am enabled to make a greater proportion of the movement of the valve available for effecting a free passage of the steam through the ports of the cylinder.

In testimony whereof I have hereunto subscribed my name.

GEORGE H. CORLISS.

Witnesses:

HENRY BALDWIN, JR.,

JOHN S. HOLLINGSHEAD.